(12) United States Patent
Baldauf et al.

(10) Patent No.: US 12,070,757 B2
(45) Date of Patent: Aug. 27, 2024

(54) ENGULFED NANO/MICRO BUBBLES FOR IMPROVED RECOVERY OF LARGE PARTICLES IN A FLOTATION CELL

(71) Applicant: International Business Machines Corporation, Armonk, NY (US)

(72) Inventors: Julia Baldauf, South Melbourne (AU);
Alexe Bojovschi, Lilydale (AU);
Stephen Moore, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 1160 days.

(21) Appl. No.: 16/389,184

(22) Filed: Apr. 19, 2019

(65) Prior Publication Data

US 2019/0240678 A1 Aug. 8, 2019

Related U.S. Application Data

(62) Division of application No. 14/799,432, filed on Jul. 14, 2015, now Pat. No. 10,315,202.

(51) Int. Cl.
*B03D 1/24* (2006.01)
*B03D 1/02* (2006.01)
(Continued)

(52) U.S. Cl.
CPC .............. *B03D 1/24* (2013.01); *B03D 1/025* (2013.01); *B03D 1/1443* (2013.01); *C02F 1/24* (2013.01); *B03D 1/02* (2013.01); *B03D 1/16* (2013.01)

(58) Field of Classification Search
CPC ....................................................... B03D 1/24
See application file for complete search history.

(56) References Cited

U.S. PATENT DOCUMENTS

| 793,808 A | 7/1905 | Sulman et al. |
| 1,157,176 A | 10/1915 | Owen |

(Continued)

FOREIGN PATENT DOCUMENTS

JP 20100162518 A 7/2010

OTHER PUBLICATIONS

English language Abstract JP20100162518.
(Continued)

*Primary Examiner* — Peter Keyworth
(74) *Attorney, Agent, or Firm* — Scully, Scott, Murphy & Presser, P.C.; Michael A. Petrocelli, Esq.

(57) ABSTRACT

A method of recovering particles from a liquid, a froth flotation apparatus, and a method of recovering particles in a flotation cell are disclosed. In an embodiment, the method comprises a technique of exposing the particles to first-size bubbles having a first predetermined size; the first-size bubbles adhering to the particles; and exposing the particles in a liquid, with the first-size bubbles adhering to the particles, to second-size bubbles having a second predetermined size, the second predetermined size being at least approximately ten times larger than the first predetermined size. The method further comprises the second-size bubbles adhering to the particles and engulfing the first-size bubbles on the particles; and using the second-size bubbles adhering to the particles to recover the particles from the liquid. In one embodiment a first surfactant is used to form the first-size bubbles, and a second surfactant is used to form the second-size bubbles.

7 Claims, 5 Drawing Sheets

(51) Int. Cl.
  *B03D 1/14* (2006.01)
  *C02F 1/24* (2023.01)
  *B03D 1/16* (2006.01)

(56) References Cited

U.S. PATENT DOCUMENTS

| | | | |
|---|---|---|---|
| 1,317,244 | A * | 9/1919 | Towne et al. ............ B03D 1/24 |
| | | | 209/170 |
| 2,919,802 | A | 1/1960 | Drake et al. |
| 4,203,837 | A | 5/1980 | Hoge et al. |
| 4,397,741 | A | 8/1983 | Miller |
| 4,979,591 | A | 12/1990 | Habegger et al. |
| 4,981,582 | A | 1/1991 | Yoon et al. |
| 5,078,921 | A | 1/1992 | Zipperian |
| 5,660,718 | A | 8/1997 | Chudacek et al. |
| 5,728,304 | A | 3/1998 | Yeh |
| 5,814,210 | A | 9/1998 | Yoon et al. |
| 6,959,815 | B2 | 11/2005 | Xu et al. |
| 7,591,452 | B2 | 9/2009 | Kohama et al. |
| 7,753,212 | B2 | 7/2010 | Pyke et al. |
| 8,205,277 | B2 | 6/2012 | Yamasaki et al. |
| 8,500,104 | B2 | 8/2013 | Spears et al. |
| 2001/0049636 | A1 | 12/2001 | Hudda et al. |
| 2006/0054205 | A1 | 3/2006 | Yabe et al. |
| 2007/0036722 | A1 | 2/2007 | Rongved et al. |
| 2007/0189972 | A1 | 8/2007 | Chiba et al. |
| 2007/0214057 | A1 | 9/2007 | Lee et al. |
| 2008/0023407 | A1 * | 1/2008 | Eriksson ................ C02F 1/24 |
| | | | 210/753 |
| 2010/0147111 | A1 * | 6/2010 | Skiles ................ C22B 15/0008 |
| | | | 75/392 |
| 2017/0014834 | A1 | 1/2017 | Baldauf et al. |

OTHER PUBLICATIONS

Toa, "Role of Bubble Size in Flotation of Coarse and Fine Particles-A Review", Separation Science and Technology (2004) 39(4); Received Jun. 1, 2003; (YEAR: 2004) pp. 741-760.

Tyrrell et al., "Images of Nanobubbles on Hydrophobic Surfaces and Their Interactions", The American Physical Society, vol. 87, No. 17, Oct. 22, 2001, pp. 176104-1176104-4.

Zhang, X. et al. "Stability of Interfacial Nanobubbles", ACS Publications, Langmuir, American Chemical Society, received Aug. 10, 2012, Revised Dec. 5, 2012, pp. A-G.

Zhou et al., "Interaction of Ionic Species and Fine Solids with a Low Energy Hydrophobic Surface from Contact Angle Measurement", Academic Press, Journal of Colloid and Interface Science, 204, pp. 342-349 (1998), received Nov. 17, 1997; accepted Apr. 14, 1998.

Yoon, "Microbubble Flotation", Minerals Engineering, vol. 6, No. 6, pp. 619-630, 1993, received Dec. 11, 1992; accepted Jan. 22, 1993.

Zhang, K. et al., "Laser-induced thermal bubbles for microfluidic applications", Lab Chip, 2011, 11, 1389, The Royal Society of Chemistry 2011, received Oct. 19, 2010, Accepted Jan. 18, 2011, pp. 1389-1395.

Clift et al., "Bubbles, Drips, and Particles", Academic Press, Inc. New York, BOOK, 1978.

List of IBM Patents or Patent Applications Treated as Related.

* cited by examiner

ENGULFED NANO/MICRO BUBBLES FOR IMPROVED RECOVERY OF LARGE PARTICLES IN A FLOTATION CELL

CROSS REFERENCE TO RELATED APPLICATION

This application is a divisional application of copending U.S. patent application Ser. No. 14/799,432, filed Jul. 14, 2015, the entire contents and disclosure of which are hereby incorporated herein by reference.

BACKGROUND

The present invention relates to the field of froth flotation used in the separation process, and more particularly, embodiments of the invention relate to the process and apparatus for enabling flotation of particles via their attachment to carrier bubbles.

Industrial processes that employ air bubbles flotation for particle separation are widely available. They aim to efficiently recover particles such as minerals, coal, oil sands and paper in mining and recycling industries. The current deficiency that hampers efficient and economic recovery of large particles is the weak attachment between carrier bubbles and particles. The state of the art in the mining industry currently allows the flotation of particles with an upper size limit of about 100 micrometer for minerals and 600 micrometer for coal. To reach smaller sizes then these values, fine grinding of the ore is required which leads to undesirable particle contamination, dust tailing and large economical expenses.

Froth flotation uses the ability of bubbles to preferentially attach to hydrophobic surfaces. This allows the selective separation of hydrophobic and hydrophilic particles. For instance in the mining industry, the ores are ground to liberate the valuable minerals. The ground rock including the liberated minerals is then mixed with water to form a slurry. Chemicals are added to the slurry which selectively bind to target minerals to enhance their hydrophobicity and thus their separation through froth flotation.

Diverse methods have been proposed to generate bubbles. Instances of these include: bubble generation using ultrasound techniques, shaking and stirring method (hydrodynamic cavitation) in which the liquid is stirred and the gas is sheared to generate bubbles, the use of chemical reactions to generate gas in a liquid, the control of pressure namely its increase to dissolve the gas in solution and its reduction to create bubbles from supersaturated dissolved gas, the use of waves with frequencies less than 1 kHz that are applied to a porous material through which gas is injected in a liquid, and other methods that include high frequency waves, such as microwaves, to locally increase the liquid temperature to generate bubbles. All these methods with the exception of the microwave method, generate bubbles with a large volume distribution.

The efforts involving the recovery of large particles have been addressed by using bubbles with an oily coating and increasing the hydrophobicity of particles. These methods rely on enhancing the attachment of the oily coating of the bubble to the particle and facilitating the expansion of the triple point contact line. The latter leads to an increase of surface contact area between the bubble and the mineral particle, facilitating the attachment.

SUMMARY

Embodiments of the invention provide a method of recovering particles from a liquid, a froth flotation apparatus, and a method of recovering particles in a flotation cell. In an embodiment, the method comprises exposing the particles to first-size bubbles having a first predetermined size; the first-size bubbles adhering to surfaces of the particles; and exposing the particles in a liquid, with the first-size bubbles adhering to the particle surfaces, to second-size bubbles having a second predetermined size, said second predetermined size being at least approximately ten times larger than the first predetermined size. The method further comprises the second-size bubbles adhering to the particle surfaces and engulfing the first-size bubbles on the particle surfaces; and using the second-size size bubbles adhering to the particle surfaces to recover the particles from the liquid.

In one embodiment, the exposing the particles to first-size bubbles includes using a first surfactant to form the first-size bubbles, and the exposing the particles to second-size bubbles includes using a second surfactant to form the second-size bubbles.

In an embodiment of the method, the surfactant used to coat nanobubbles has a first molecular length; and the surfactant used to coat micrometer and millimeter bubbles has a second molecular length, said first molecular length being longer than the second molecular length.

In one embodiment, the exposing the particles to first-size bubbles includes spraying the particles with a surfactant before exposing the particles to the first-size bubbles; conducting the particles downward through a first region of a flotation cell with the surfactant sprayed on the particles, and injecting the first-size bubbles into the first region of the flotation cell to adhere the first-size bubbles to the particles.

In an embodiment, the exposing the particles to the second-size bubbles includes conducting the particles, with the first-size bubbles adhering to the particles, into a second region of the flotation cell; and exposing the particles to the second-size bubbles in the second region of the flotation cell.

In an embodiment, the spraying the particles with a surfactant includes spraying the particle with a first surfactant; and the exposing the particles to the second-size bubbles in the second region of the flotation cell includes exposing the particles to a second surfactant in the second region.

In one embodiment, the exposing the particles to the first-size bubbles includes exposing the particles to the first-size bubbles in a first region of the flotation cell, and the exposing the particles to second-size bubbles includes exposing the particles to the second-size bubbles in a second region of the flotation cell.

In an embodiment, the first-size bubbles are nano-size bubbles, and the second size bubbles are micron or larger size bubbles.

In one embodiment, the nano-size bubbles have sizes less than approximately one micron.

In an embodiment, the first-bubbles are micron sized bubbles, and the second bubbles are millimeter-size bubbles.

In an embodiment, the invention provides a froth flotation apparatus for recovery of selected particles from a mixture of particles. The froth flotation apparatus comprises a first region for receiving the mixture of particles; a smaller bubble generator for supplying to the first region first-size bubbles having a first predetermined size to expose the mixture of particles therein to the first-size bubbles, wherein some of the first-size bubbles adhere to surfaces of a selected group of particles of the mixture of particles; and a second region in communication with the first region for receiving from the first region the mixture of particles including the selected group of particles with the first-size bubbles adhered thereto. The froth flotation apparatus further comprises a larger bubble generator for supplying second-size bubbles having a second predetermined size to the second region to expose the selected group of particles, with the some of the first-size bubbles adhered thereto, to the second-size bubbles. In this embodiment, said second predetermined size is at least approximately ten times larger than the first predetermined size, and the second-size bubbles adhere to the surfaces of the selected group of particles and engulf some of the first-size bubbles on the surfaces of the selected group of particles, and the selected group of particles flow to an outlet of the froth flotation apparatus and separate from other particles in the mixture of particles.

In an embodiment, the first region is substantially free of the second-size bubbles.

In one embodiment, the froth flotation apparatus further comprises a conveyor for supplying the mixture of particles to the first region, and a spraying system to spray the mixture of particles on the conveyor with a surfactant.

In an embodiment, a first surfactant is used to form the first-size bubbles, and a second surfactant is used to form the second-size bubbles.

In one embodiment of the froth flotation apparatus, the surfactant used to coat nanobubbles has a first molecular length, the surfactant used to coat micrometer and millimeter bubbles has a second molecular length, and the first molecular length is longer than the second molecular length.

In an embodiment, the invention provides a method of recovering particles in a flotation cell. The method comprises exposing a mixture of particles in a first region of the flotation cell to first-size bubbles having a first predetermined size, wherein some of the first-size bubbles adhere to surfaces of a selected group of particles of the mixture of particles. The method further comprises exposing the mixture of particles in a second region of the flotation cell to second size bubbles having a second predetermined size. The predetermined size is at least approximately ten times larger than the first predetermined size, and some of the second-size bubbles adhere to the surfaces of the selected group of particles and engulf some of the first-size bubbles on said surfaces. This method further comprises using the second-size bubbles adhered to the surfaces of the selected group of particles to separate the selected group of particles from other particles in the mixture.

In one embodiment, the exposing the mixture of particles to first-size bubbles includes using a first surfactant to form the first-size bubbles, and the exposing the mixture of particles to second-size bubbles includes using a second surfactant to form the second-size bubbles. The first surfactant has a first molecular length; and the second surfactant has a second molecular length, said first molecular length being longer than the second molecular length.

In an embodiment, the exposing the mixture of particles to first-size bubbles includes spraying the mixture of particles with the first surfactant before exposing the particles to the first-size bubbles.

In one embodiment, the exposing the mixture of particles to first-size bubbles further includes conducting the mixture of particles downward through the first region of the flotation cell with the first surfactant sprayed on the mixture of particles, injecting the first-size bubbles into the first region of the flotation cell to adhere the firs-size bubbles to the selected group of particles, and maintaining the first region of the flotation cell substantially free of the second-size bubbles.

In an embodiment, the conducting the mixture of particles through the first region of the flotation cell includes conducting the mixture of particles downward through the first region, and the injecting the first-size bubbles into the first region includes conducting the first-size bubbles upward through the first region.

Embodiments of the invention provide use of a multitude of nano/micro bubbles or a combination thereof situated on the surface of a solid particle to increase its attachment to a larger carrier bubble. They enhance the adhesion between the two entities thereby facilitating the flotation of larger particles.

Embodiments of the invention provide a method and apparatus for floating particles larger than about 100 micrometer (for minerals) and 600 micrometer (for coal), which is the upper size limit of current technologies. This is achieved by the use of engulfed nano/micro bubbles at the interface between a particle and a flotation bubble, whereas the particle's surface has to be hydrophobic or hydrophobized.

Embodiments of this method exploits the high stability of surface nanobubbles and their use to expand the surface contact area between the particle and the large carrier bubble.

The apparatus comprises a flotation column equipped with a nano/micro bubble generator that ensures the creation of uniform nano/micro bubbles on the surface of the particles. Herein nano and micro bubbles are referred to bubbles having a diameter no more than 1 micrometer and 100 micrometer respectively.

Currently surfactants are introduced in the flotation cells and mixed with the slurry. The absorption on the surface of particles takes place in the flotation cell. Molecules with longer chains, which ensure a better attachment, require longer time to be absorbed on the surfaces. Their use can be prohibited in flotation cells when their absorption time is longer compared to flotation time. Herein a method to provide a more efficient coating of particles is described. The slurry which contains the valuable particles are introduced in the column coated by a surfactant. This is achieved by spraying the particles while they are transported on a conveyer belt. The surfactant molecules have long hydrophobic chains to increase the nanobubble particle attachment. The conveyer belt allows the drainage of the surfactant so that only the particles with a fine layer of surfactant enter the flotation column.

The large bubbles used for flotation may be generated, for example, via one of the traditional means of injection or hydrodynamic cavitation. These bubbles will have smaller surfactant molecules, absorbed from the solution, on their surface.

The choice of two surfactant molecules with different molecular lengths reduces the probability of coalescence of gas bubbles and additionally ensuring a low miscibility.

The presence of nanobubbles on the surface of particles has a number of advantages. One significant advantage is the increased probability of collision of particles with larger air bubbles, and another important advantage is the increased adhesion between the two entities.

U.S. Pat. No. 793,808 (Sulman et al., 1905) discloses the use of carrier bubbles in a flotation cell. In this Patent, bubbles of air or other gases were proposed to be used to attach to solid particles moistened by oil or the like. The studies that followed strove to control the attachment between the gas bubble and particle by tuning the surface chemistry of the two entities. These together with the optimization of the flotation cells, to ensure the right hydrodynamic condition, are carried out to achieve a maximum recovery of target particles.

Nano and micro bubbles have been used to enhance the recovery of very fine particles (smaller than 10 micrometer). In these cases, the nanobubbles facilitated the formation of conglomerates of colloidal particles which are dispersed in the flotation cell. To improve the collision efficiency the use of microbubbles as flotation carriers was proposed. The hydrodynamic cavitation used to aerate the feed was adopted to improve the particle flotation. This resulted in the use of picobubbles (<100 micrometer) technology for fine coal flotation.

U.S. Patent Application Publication No. 2007/0189972 (Chiba et al.) discloses the generation of stable nanobubbles (with life-span of one or more months) in electrolytic solution. Nanobubbles are also reported to be stable in solution in the presence of a surfactant or organic coating. The physics behind the long lifetime of nanobubbles attached to surfaces was also shown. The surface roughness contributes also to their stability through the pinning effect.

As mentioned above, diverse methods have been proposed to generate bubbles. All these methods with the exception of the microwave method, generate bubbles with a large volume distribution. Controlling the size of the bubbles generated in solution has been disclosed. The method has the capability of creating monodispersed (uniform) nano/micro bubbles.

DETAILED DESCRIPTION

Figure 1:
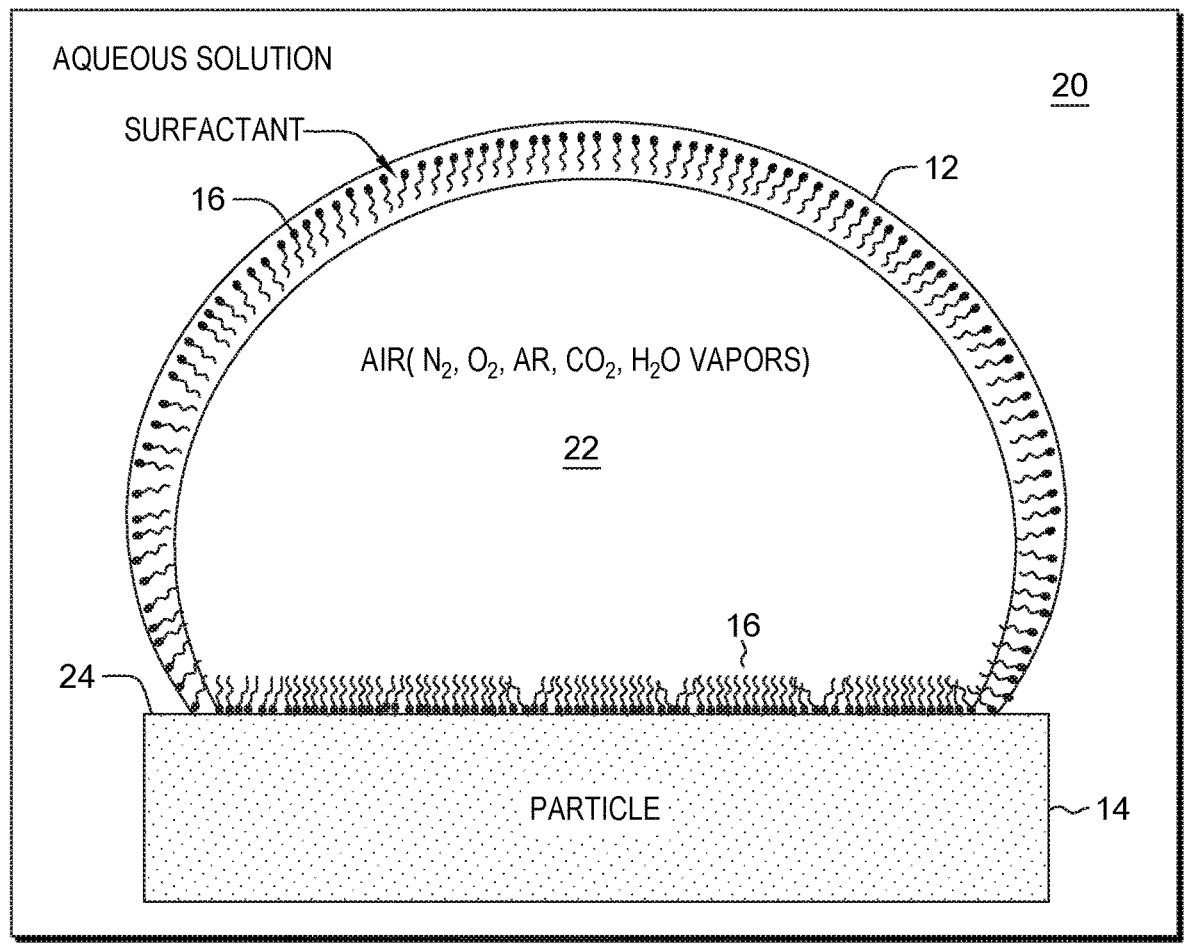
FIG. 1 shows a carrier bubble attached to a hydrophobic surface in a aqueous solution.

FIG. 1 illustrates an attachment of a bubble 12 to a particle 14 that may be obtained in the prior art. The bubble is formed by a surfactant 16 in an aqueous solution 20, and the interior 22 of the bubble contains a gaseous mixture, typically air. The bubble is attached to a hydrophobic surface 24 of the particle 14 along contacting surfaces.

Figure 2:
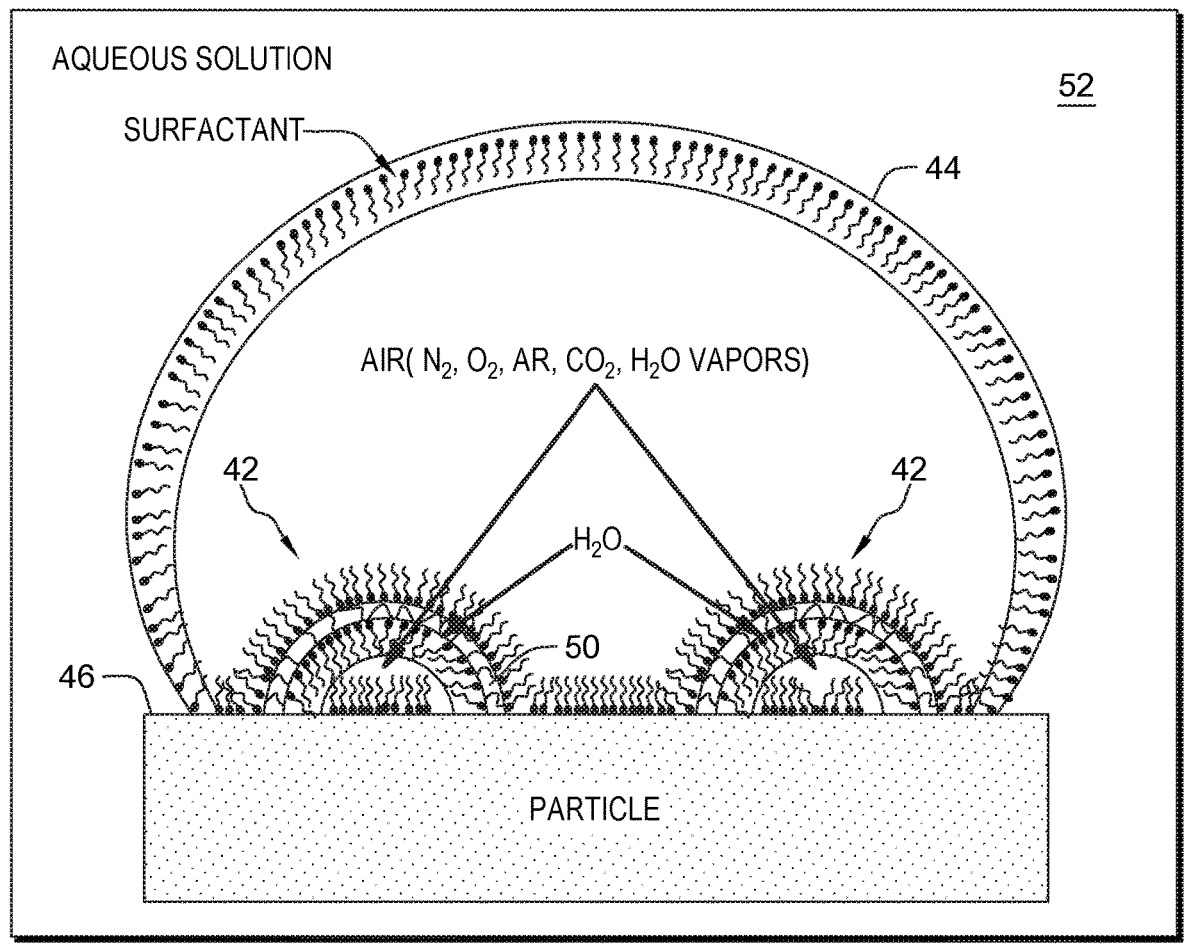
FIG. 2 schematically represents two nano/micro bubbles engulfed in a larger bubble of order of millimeters.

With reference to FIG. 2, embodiments of the present invention depart from the prior art by using nano/micro bubbles 42 at the interface between the carrier bubble 44 and the particle 46. This leads to an enhancement in adhesion between the particle 46 and the carrier bubble 44. This translates into an improved recovery of larger particles in a flotation cell.

The presence of nano/micro bubbles at the interface, leads to an increase in the surface of the particles-nano/micro bubble system and an increased interaction with millimeter size bubbles 44. The nano/micro bubbles 42 are stabilized by a surfactant molecule 50. Those skilled in the art will appreciate that for different particles, a specific surfactant is more appropriate to achieve an effective attachment. The content of the bubbles 42 can be air or any other gas. It may also be noted that gases have different affinity to surfaces. The desired choice of gas in tandem with the surfactant for a specific particle helps to achieve improved attachment. The existence of the system in the aqueous solution 52 can lead to water molecules ($H_2O$) being trapped at the surface of nanobubbles.

Embodiments of the present invention can be incorporated in an existing installation thereby increasing the recovery of larger particles with a reduced expenditure. Alternatively, a new installation, for example as shown in FIG. 3, can be used which will be outlined below.

Figure 3:
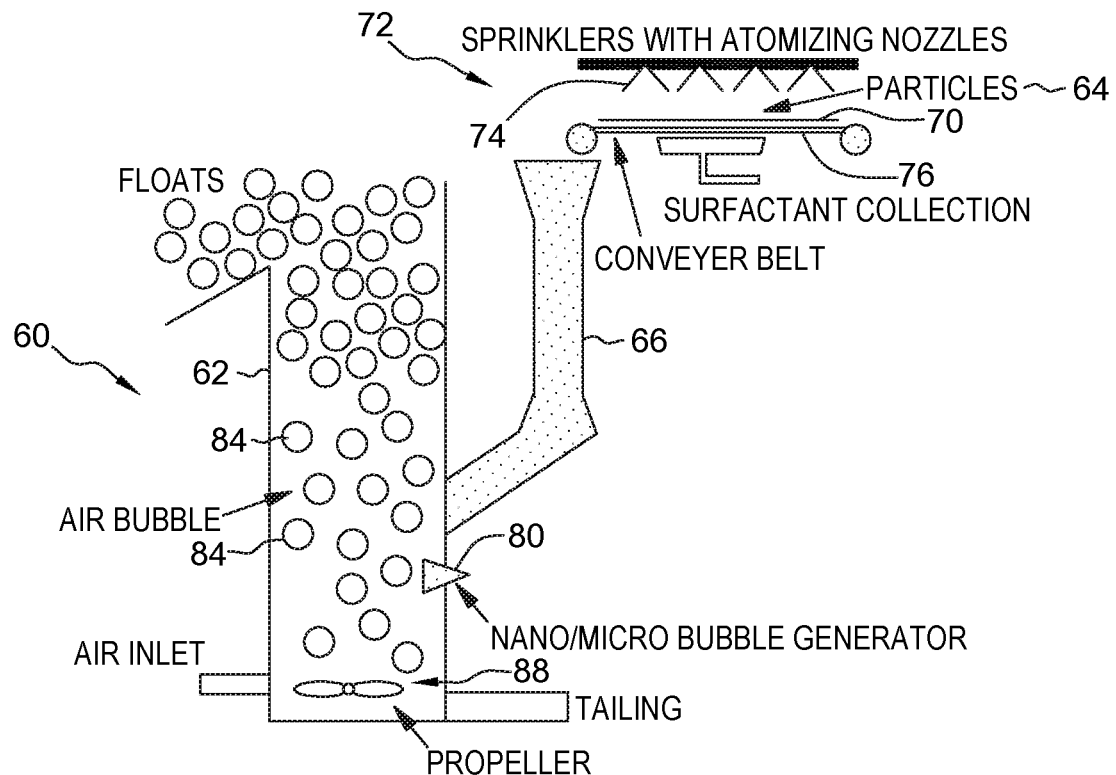
FIG. 3 illustrates a froth flotation cell in accordance with an embodiment of the invention.

With reference to FIG. 3, a flotation cell 60 is comprised of a traditional cylindrical container 62. The particles 64 are introduced in the feed inlet 66 via a conveyor belt 70 and sprinklers 72 with atomizing nozzle system 74 are used. The atomizing nozzle system 74 disperses small droplets of surfactant on the particles. This ensures a coverage of particles with a thin layer of surfactant. The conveyor belt 70 is provided with orifices to allow the excess surfactant to be collected at 76 and reintroduced in the system. This ensures that only particles with a fine layer of surfactant enter the flotation cell 60. This procedure speeds up the attachment of nano-bubbles to the surfaces of particles.

A nano/micro bubble generator 80 creates uniform nano/micro bubbles on the hydrophobic particles that enter the flotation cell. The particle nano/micro bubbles systems formed collide with the large bubbles 84 generated close to the bottom of the flotation cell through hydrodynamic cavitation or other conventional means, represented at 88. The system of particle, nano/micro bubbles and large bubble float to the surface of the cell where they are collected.

Figure 4:
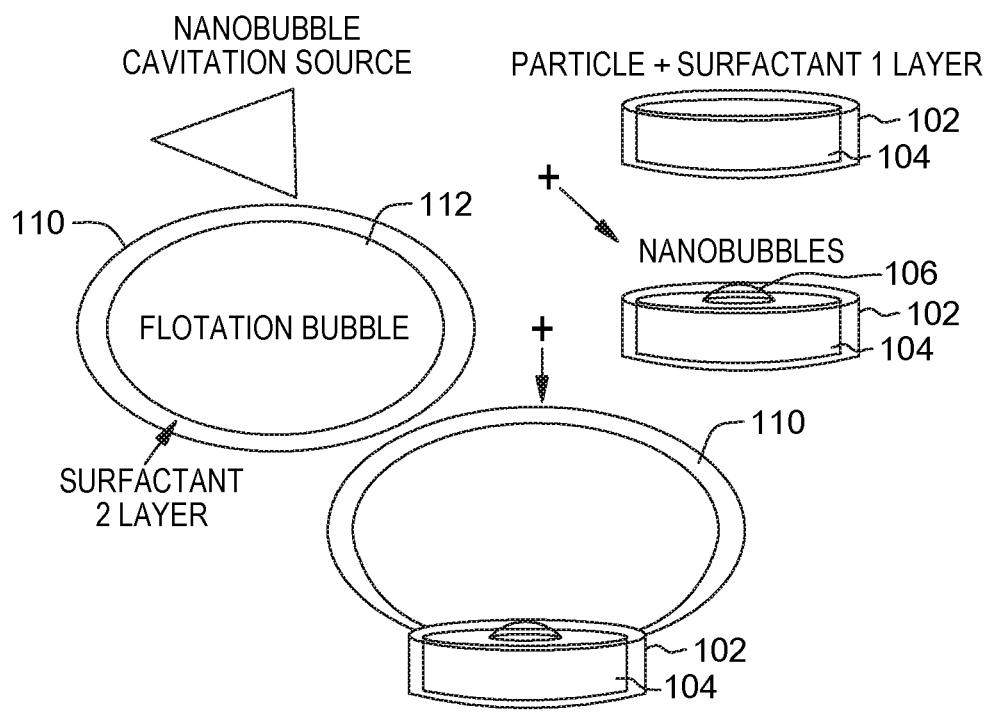
FIG. 4 shows steps leading to a floatable particle, nano/micro bubble and a large bubble system in an embodiment of the invention.

A detailed description of the steps involved in the formation of particle, nano/micro bubbles and large bubble system is presented in FIG. 4. The surfactant layer 102 on the particle 104 enhances its hydrophobicity and facilitates the generation of nano/micro bubbles 106 on its surface. Furthermore, the choice of two different surfactants 102, 110 (surfactant 1 and 2) reduces the probability of coalescence between the particles used herein.

Figure 5:
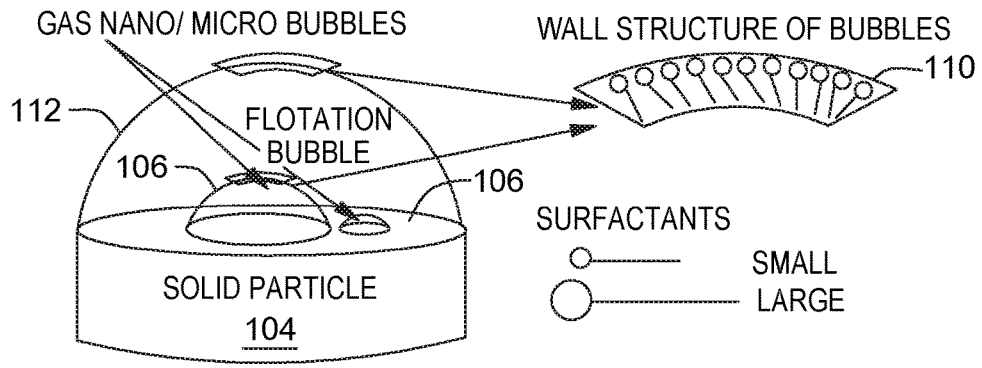
FIG. 5 depicts a large bubble attached to the surface of a solid particle and engulfing nano/micro bubbles.

The molecular length of surfactants 102, 110 is preferably smaller for surfactant 110 for the large bubble 112 and longer for surfactant 102 for the small nano/micro bubbles 106. This is depicted schematically in FIG. 5. It should be noted that similar mechanisms can be obtained with the same surfactant however the coalescence of the nano/micro bubbles, which are close to the three points contact line, with the large bubble leads to a decrease in attachment.

The large bubble 112 attaches to the surface of the particle 104, engulfing the nano/micro bubble 106 in the process. The large surfactant 102 molecules are displaced on the particle and form the walls of the nano/micro bubbles 106 thereby increasing the surface hydrophobicity and nano/micro bubble stability respectively.

Figure 6:
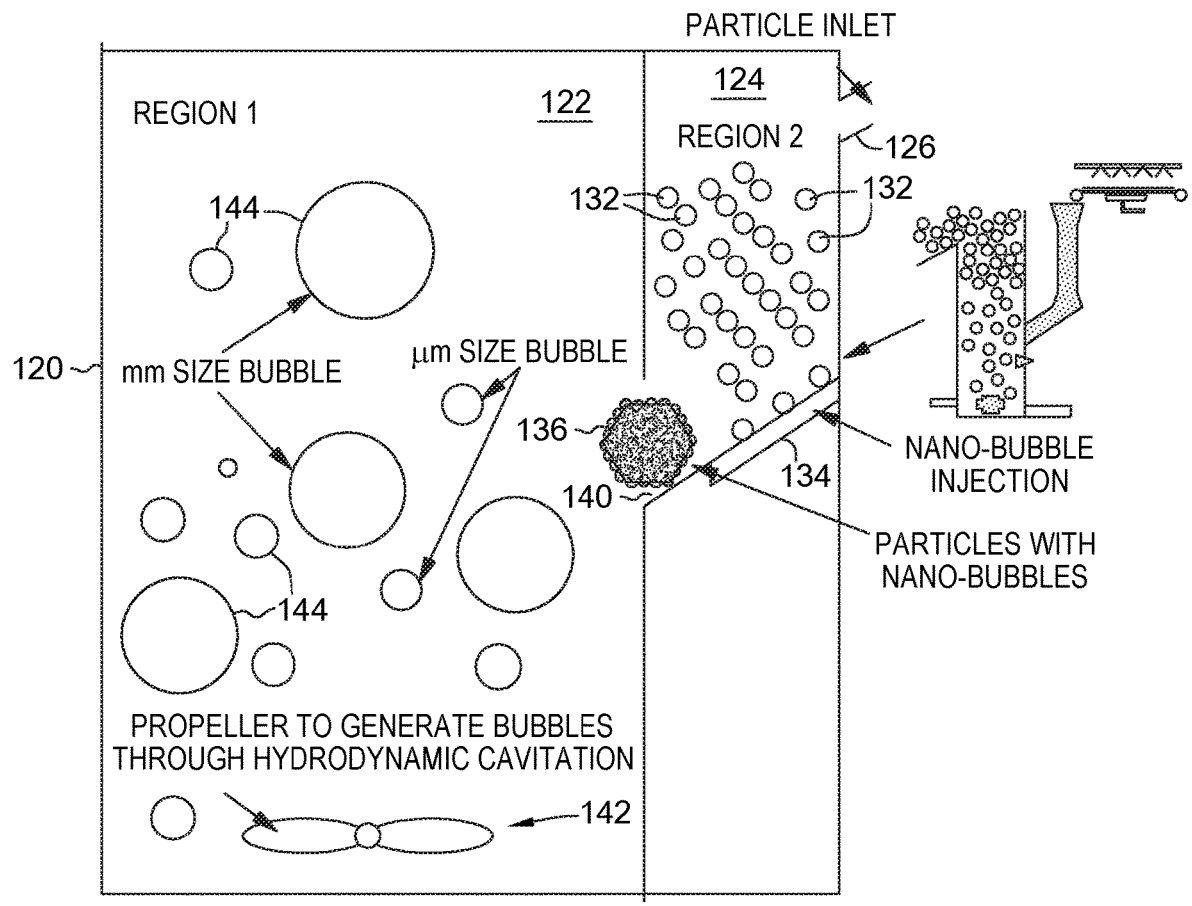
FIG. 6 illustrates a flotation column in accordance with an embodiment of the invention.
Figure 7:
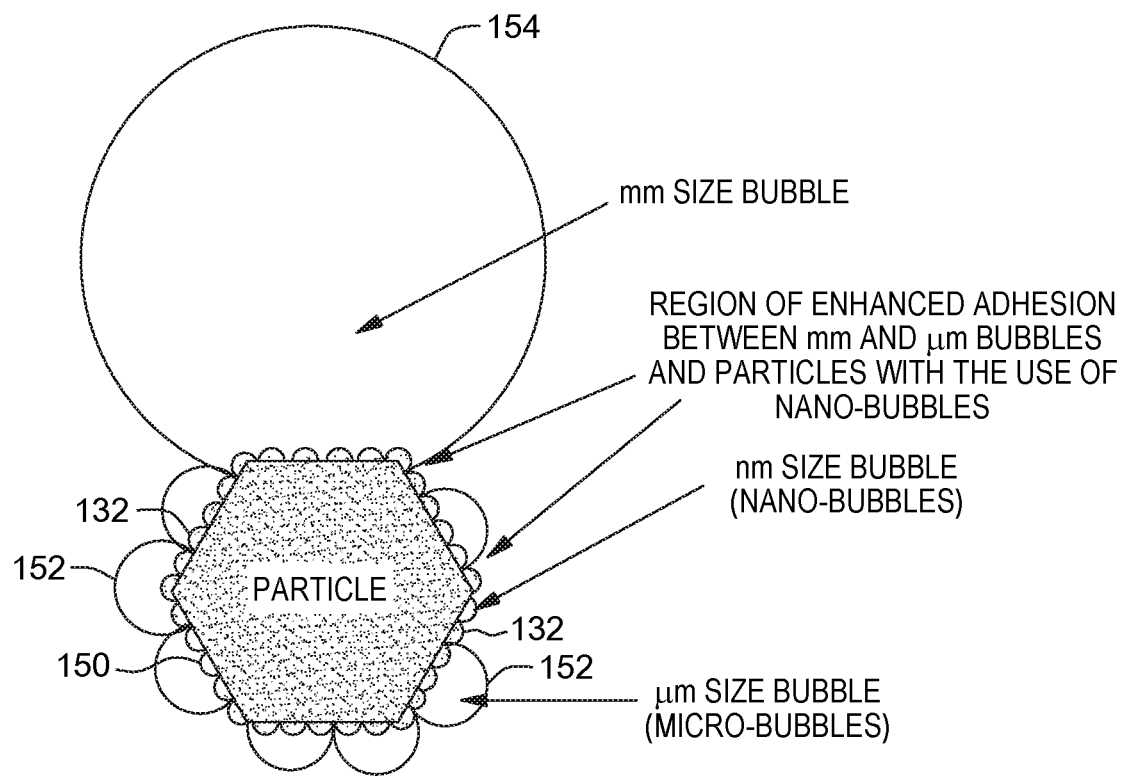
FIG. 7 shows the configuration of a particle with nano-micro and millimeter size bubbles.

FIGS. 6 and 7 illustrate aspects of this invention in more detail. In particular, FIG. 6 shows a flotation column 120 and the way that column is used.

In this embodiment, the flotation column 120 includes region 1, referenced at 122, and region 2, referenced at 124. Particles 136 are introduced into region 2 through inlet 126, and nano-bubbles 132 are injected into region 2 at 134. Particles 136 with attached nano-bubbles pass from region 2 to region 1 through opening 140. A suitable mechanism 142, such as propeller, is located in region 1 to generate millimeter size bubbles 144.

As discussed above, embodiments of the invention rely on the use of engulfed nano-bubbles to enhance the flotation of larger particles (coarser particles). With the embodiment of FIG. 6, this is achieved through the introduction of the nano-bubbles 132 via a slanted system 134 in region 2, the use of surfactants, as discussed above, that prohibit the coalescence of bubbles, and the introduction of already coated particles 136 into region 1.

More specifically, in the flotation column of FIG. 6, the nano-bubbles 132 are introduced via a slanted system 134 in region 2. This increases significantly the probability of attachment between nano-bubbles and particles. The presence of larger bubbles in this region would prohibit attachment of the nano-bubbles to the particles. This is due to a larger probability of large bubble particle collision.

With reference to FIG. 7, this attachment of the nano-bubbles 132 to the particles 150 allows the particles covered with nano-bubbles to attach to micron size bubbles 152 or millimeter size bubbles 154. The nano-bubbles 132 effectively increase the size of the particles 150 which leads to an increase of the attachment probability, and increases the attachment between the particles 150 and the micron size bubbles 152 and millimeter size bubbles 154. Also, as mentioned above, this embodiment of the invention includes the use of surfactants that prohibit the coalescence of bubbles, and the particle introduced into region 1 are already coated with the nano-bubbles.

In embodiments of the invention, smaller size bubbles are engulfed upon collision by larger size bubbles in flotation cells.

Indeed, nano/micro meter size bubbles are engulfed by mm size bubbles when they come in contact, assuming that the coalescence is suppressed by the use of surfactants. Nano-bubbles will also be engulfed by micro-bubbles if the difference between their radius is large enough (e.g., a 50 nanometer size bubble can be engulfed by a 50 microns size bubble, the latter bubble is 1000 times larger in this case). Generally, for a bubble to engulf a smaller bubble, the radius of the larger bubble should be at least 10 times larger than the radius of the smaller bubble.

The description of the present invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and application of the invention, and to enable others of ordinary skill in the art to understand the invention. The invention may be implemented in various embodiments with various modifications as are suited to a particular contemplated use.

The invention claimed is:

1. A froth flotation apparatus for recovery of selected particles from a mixture of particles, the froth flotation apparatus comprising:
   a single flotation column;
   a partition physically dividing the single flotation column into a first region and a second region, the second region abutting the first region along a length thereof;
   a conveyor having a conveyor belt for supplying the mixture of particles to the single flotation column, the particles of said mixture having a surfactant sprayed thereon;
   an inlet having an opening at a side surface of the flotation column at said first region for receiving, from said conveyor belt, the mixture of particles at said first region;
   a smaller bubble generator for supplying to the first region first-size bubbles having a first predetermined size to expose the mixture of particles therein to the first-size bubbles, wherein some of the first-size bubbles adhere to surfaces of a selected group of particles of the mixture of particles, the first-size bubbles being supplied to said first region via a slanted conveyance system, said inlet situated above the slanted conveyance system such that the mixture of particles are conducted downward through the first region while the first-size bubbles supplied via the slanted conveyance system are conducted upward through the first region;
   an opening at said dividing partition permitting a flow of the selected group of particles having the first-size bubbles adhered to surfaces thereof from said first region to said second region, said second region for receiving from the first region, via the opening, the mixture of particles including the selected group of particles with some of the first-size bubbles adhered thereto; and
   a larger bubble generator for supplying second-size bubbles to the second region to expose the selected group of particles, with the some of the first-size bubbles adhered thereto, to the second-size bubbles, wherein said second predetermined size is at least ten times larger than the first predetermined size, and the second-size bubbles adhere to the surfaces of the selected group of particles and engulf some of the first-size bubbles on the surfaces of the selected group of particles, and the selected group of particles rise to an outlet of the froth flotation apparatus and separate from other particles in the mixture of particles, wherein said conveyor belt is provided with orifices that allow excess surfactant sprayed on said mixture of particles to be collected.

2. The froth flotation apparatus according to claim 1, wherein the first region is free of the second-size bubbles.

3. The froth flotation apparatus according to claim 2, further comprising:
   a spraying system to spray the mixture of particles on the conveyor with the surfactant.

4. The froth flotation apparatus according to claim 1, wherein:
   a first surfactant is used to form the first-size bubbles; and
   a second surfactant is used to form the second-size bubbles.

5. The froth flotation apparatus according to claim 4, wherein:
   the first surfactant has a first molecular length;
   the second surfactant has a second molecular length; and
   the first molecular length is longer than the second molecular length.

6. The froth flotation apparatus according to claim 4, wherein the first surfactant has a first molecular length, the second surfactant has a second molecular length, and the first molecular length is longer than the second molecular length.

7. The froth flotation apparatus according to claim 3, wherein said spraying system further comprises:
   a sprinkler having atomizing nozzles for applying small drops of surfactant to particles conveyed on said conveyor belt.

* * * * *